United States Patent
Kamiyama et al.

[11] Patent Number: 5,321,273
[45] Date of Patent: Jun. 14, 1994

[54] DOCUMENT SIZE SENSING HAVING A SPECTROSCOPE

[75] Inventors: Toru Kamiyama, Kawasaki; Hiroshi Hanzawa, Yachiyo, both of Japan

[73] Assignee: Ricoh Company, Ltd., Tokyo, Japan

[21] Appl. No.: 976,324

[22] Filed: Nov. 13, 1992

[30] Foreign Application Priority Data

Nov. 14, 1991 [JP] Japan ................................ 3-297524
May 8, 1992 [JP] Japan ................................ 4-115961

[51] Int. Cl.⁵ ........................ G03G 21/00; G01N 21/26
[52] U.S. Cl. ............................................ 250/560; 356/386
[58] Field of Search ................ 250/560, 561; 356/375, 356/383–387

[56] References Cited

U.S. PATENT DOCUMENTS

| | | | |
|---|---|---|---|
| 2,791,931 | 5/1957 | Summerhayes, Jr. | 356/386 |
| 4,505,575 | 3/1985 | Kurata et al. | 250/560 |
| 4,572,650 | 2/1986 | Okuda | 250/560 |
| 4,698,511 | 10/1987 | Sueda et al. | 250/560 |

FOREIGN PATENT DOCUMENTS

| | | |
|---|---|---|
| 61-109046 | 5/1986 | Japan . |
| 61-143735 | 7/1986 | Japan . |
| 62-124547 | 6/1987 | Japan . |
| 2-207237 | 8/1990 | Japan . |
| 3-89334 | 4/1991 | Japan . |

*Primary Examiner*—David C. Nelms
*Assistant Examiner*—Stephone B. Allen
*Attorney, Agent, or Firm*—Oblon, Spivak, McClelland, Maier & Neustadt

[57] ABSTRACT

A document size sensing device incorporated in an image recorder and capable of sensing a plurality of document sizes with a small number of optical elements. A sensor is made up of a single light emitting element, a spectroscope for dividing light issuing from the light emitting element into a plurality of beams toward a plane where a document is laid, a lens on which light reflected by the document is incident, and a plurality of light-sensitive elements for receiving the light propagating through the lens. A single sensor with such a configuration can sense a plurality of document sizes.

13 Claims, 13 Drawing Sheets

DOCUMENT SIZE SENSING HAVING A SPECTROSCOPE

BACKGROUND OF THE INVENTION

The present invention relates to a copier, image reader, facsimile transceiver or similar image recorder and, more particularly, to a device incorporated in an image recorder for sensing the size of a document laid on a glass platen to be copied.

An image recorder of the type laying a document to be copied on a glass platen, scanning the document to read an image thereof, and then reproducing it on a paper or similar recording medium is conventional. It is a common practice with this type of image recorder to determine the size of the document positioned on the glass platen in the event of reading an image printed on the document. For this purpose, it has been customary to arrange a group of sensors responsive to the document width below the glass platen in a main scanning direction, and another group of sensors responsive to the document length in the subscanning direction. Such a sensing device, however, cannot cope with many document sizes without resorting to a great number of sensors in each of the main and subscanning directions. Moreover, since each sensor is made up of a light emitting element and a light-sensitive element, a great number of optical elements are required in total, increasing the cost of the sensing device.

SUMMARY OF THE INVENTION

It is, therefore, an object of the present invention to provide a document size sensing device operable with a minimum number of optical elements and, therefore, a minimum of cost.

It is another object of the present invention to provide a document size sensing device capable of determining the size of a document with accuracy even when the document is dislocated on a glass platen.

It is another object of the present invention to provide a document size sensing device free from errors ascribable to undesirable reflections.

A document size sensing device having at least one sensing means of the present invention comprises a single light emitting element facing a transparent glass platen to be loaded with a document, a spectroscope for dividing light issuing from the light emitting element into a plurality of beams toward a plane where the document is present, a lens for receiving light reflected from the plane, and a plurality of light-sensitive elements facing a light output side of the lens for receiving the light transmitted through the lens.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, a brief reference will be made to a prior art document size sensing device, shown in FIG. 21. As shown, the sensing device has a width sensor A 51 and a width sensor B 52 arranged in the main scanning direction, and a length sensor A 53, a length sensor B 54, a length sensor C 55, a length sensor D 56 and a length sensor E 57 arranged in the subscanning direction. The width sensors and the length sensors are located below a glass platen, not shown, for sensing respectively the width and the length of a document. A document size is determined on the basis of the outputs of the width and length sensors and with reference to Table 1 shown below.

TABLE 1

| SIZE | | WIDTH SENSOR A | WIDTH SENSOR B | LENGTH SENSOR A | LENGTH SENSOR B | LENGTH SENSOR C | LENGTH SENSOR D | LENGTH SENSOR E |
|---|---|---|---|---|---|---|---|---|
| A3 & ABOVE | 11' × 17' | ◯ | ◯ | ◯ | ◯ | ◯ | ◯ | ◯ |

TABLE 1-continued

| | SIZE | SENSOR | | | | | | |
|---|---|---|---|---|---|---|---|---|
| | | WIDTH SENSOR A | WIDTH SENSOR B | LENGTH SENSOR A | LENGTH SENSOR B | LENGTH SENSOR C | LENGTH SENSOR D | LENGTH SENSOR E |
| B4 | 11' × 15' | O | O | O | O | O | O | X |
| | 10' × 14' | | | | | | | |
| A4 LONG. | 8/' × 11' | X | O | O | O | X | X | X |
| B5 LONG. | 8' × 10' | X | O | O | X | X | X | X |
| A5 LONG. & BELOW | 5¼' × 8¼' | X | X | X | X | X | X | X |
| A4 LAT. | 11' × 8¼' | O | O | O | X | X | X | X |
| B5 LAT. | 8¼' × 5¼' | O | O | X | X | X | X | X |
| A5 LAT. | (8¼' × 5¼') | X | O | X | X | X | X | X |

Note: Circle and cross in Table 1 are respectively representative of the presence and the absence of a document.

Figure 21:
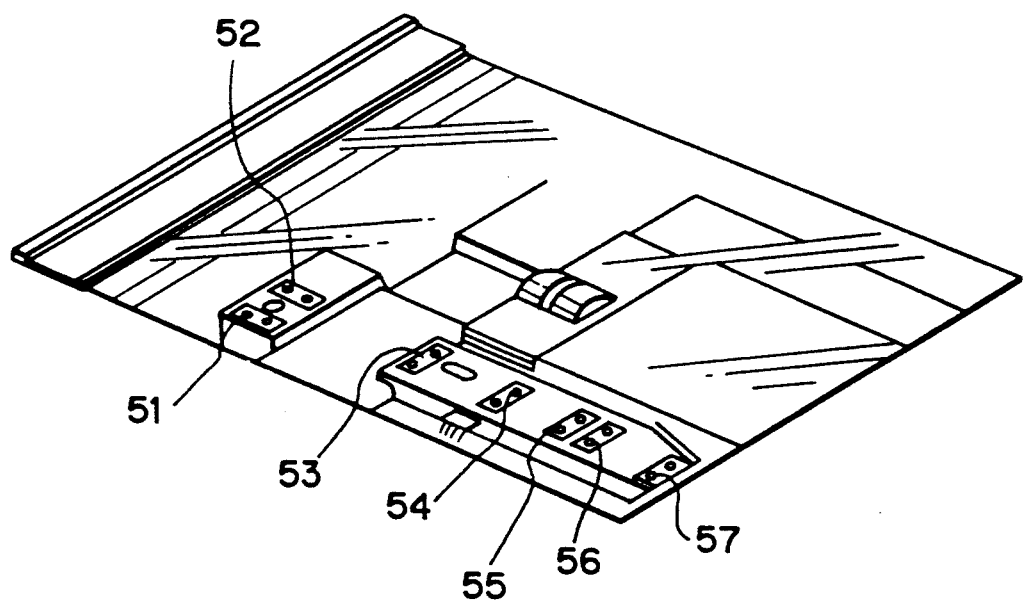
FIG. 21 is a perspective view showing a conventional document size sensing device.

A problem with the sensing device shown in FIG. 21 is that many sensors have to be arranged in each of the main and subscanning directions, as stated earlier. In addition, since each sensor is made up of a light emitting element and a light-sensitive element, a great number of optical elements are required in total, increasing the cost of the sensing device.

Figure 2:
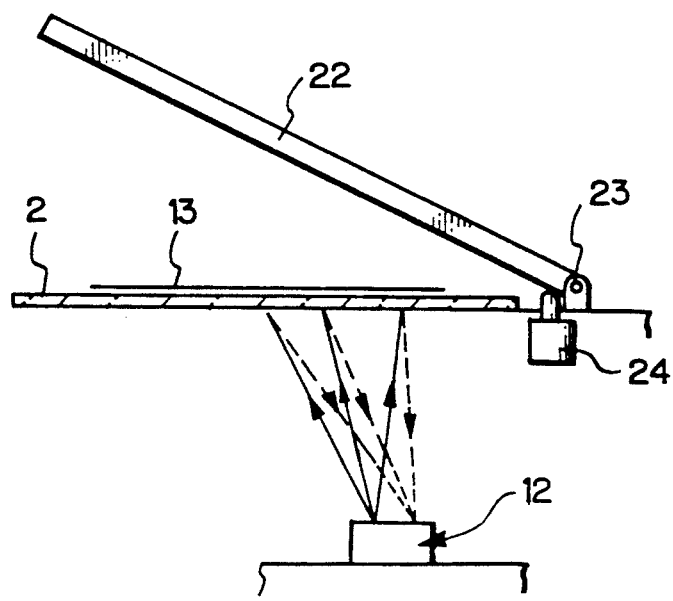
FIG. 2 is a side elevation of the embodiment.
Figure 3:
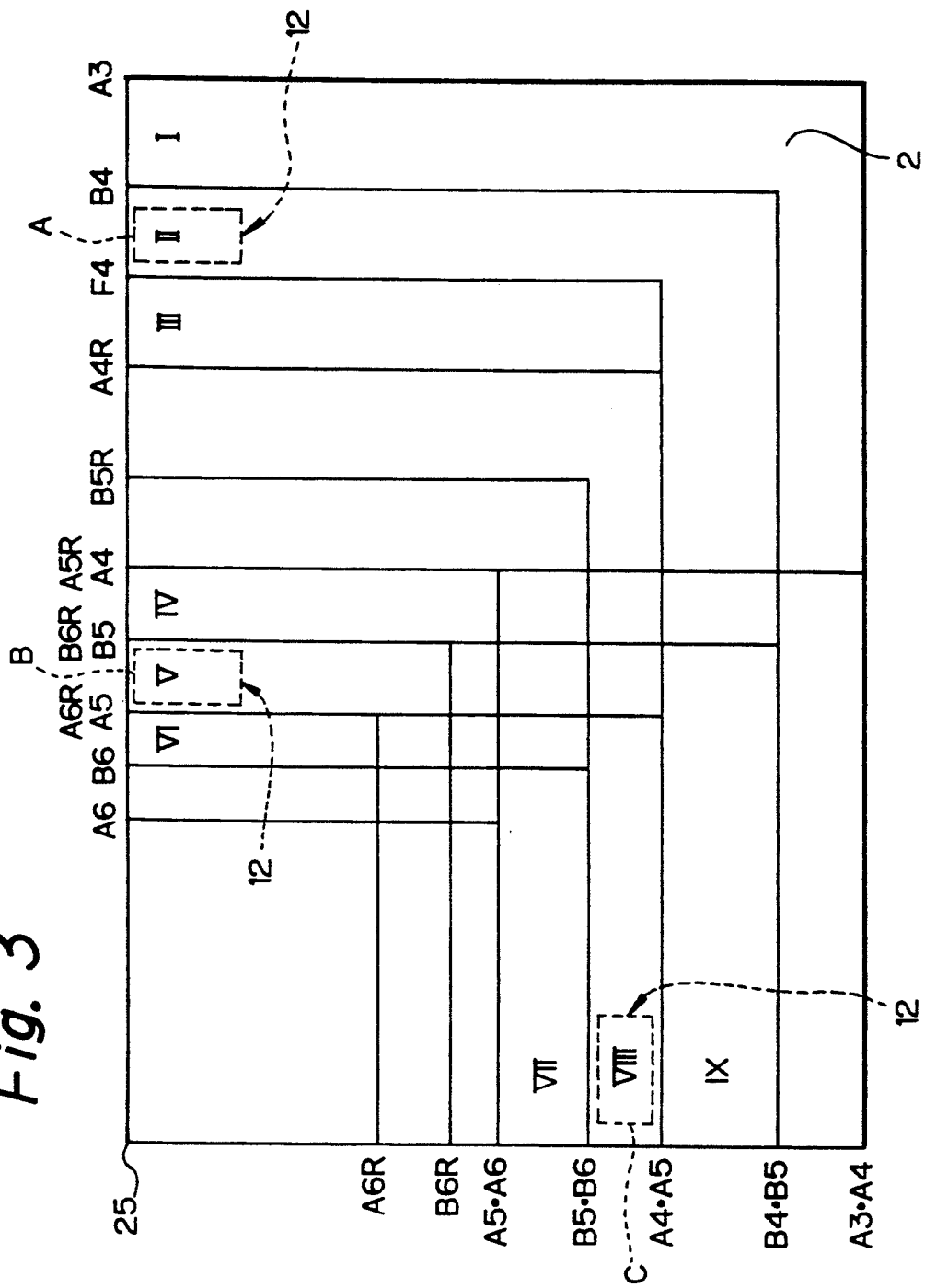
FIG. 3 is a plan view showing a relation between a document setting position on a glass platen and document sizes particular to the embodiment.
Figure 4:
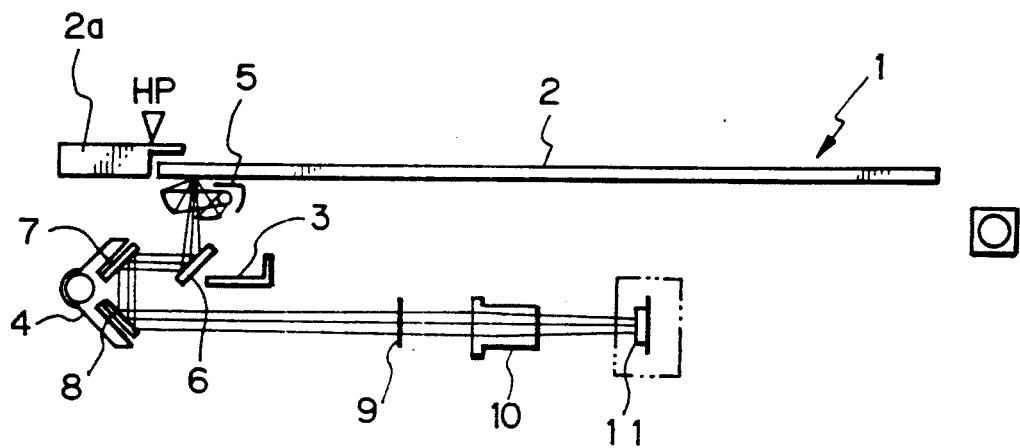
FIG. 4 is a sectional side elevation showing the internal arrangement of a document reader.

Referring to FIGS. 1-9, a document size sensing device embodying the present invention is shown. FIG. 4 shows an image reader 1 to which the embodiment is applied. The image reader 1 has a transparent glass platen 2, and a scale 2a located at one end of the glass platen 2. A first scanner 3 and a second scanner 4 are disposed below the glass platen 2, and each is movable in a reciprocating motion. The scanner 3 has a light source 5 for illuminating a document laid on the glass platen 2, and a mirror 6 for reflecting light from the document. The other scanner 4 has mirrors 7 and 8 for sequentially reflecting light from the mirror 6. Also disposed below the glass platen 2 are a filter 9, a lens 10, and a solid state imaging device 11. The filter 9 intercepts infrared rays included in the light from the mirror 8. The lens 10 converges the light transmitted through the filter 9. The light from the lens 10 is incident on the imaging device 11.

Figure 1:
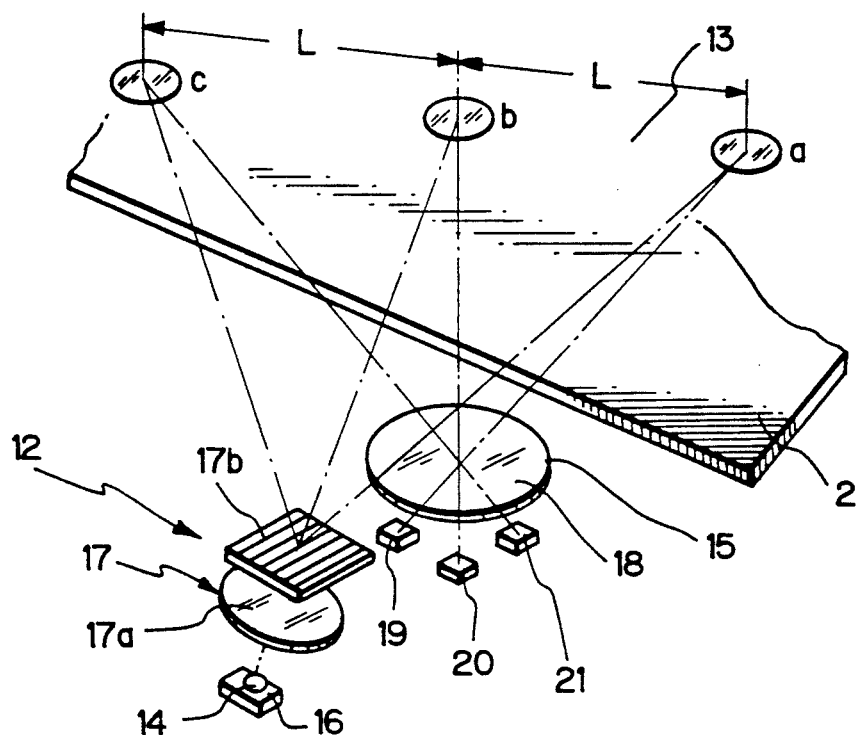
FIG. 1 is a perspective view showing a document sensing device embodying the present invention.

A size sensor is shown in FIG. 1 and generally designated by the reference numeral 12. The size sensor 12 is generally made up of an illuminating section 14 for illuminating a document 13, and a light receiving section 15 on which light reflected by the document 13 is incident. The illuminating section 14 has a single light emitting element 16 and a single spectroscope 17. While the light emitting element 16 emits light toward a lens 17a, the spectroscope 17 divides the light transmitted through the lens 17a into zeroth order light (transmitted light) and first order light (diffracted light) with a diffraction grating 17b. The light receiving section 15 has a single lens 18 and three light-sensitive elements 19, 20 and 21. The light-sensitive elements 19-21 are located to face the lens 18 and arranged on an arc such that the element 19 located at one side receives a reflection from a sensing point a in a plane where the document 13 is laid, the intermediate element 20 receives a reflection from a sensing point b in the same document plane, and the element 21 located at the other side receives a reflection from a sensing point c in the same plane. The distance between the points a and b and the distance between the points b and c are the same, as labeled L. Accordingly, the light-sensitive elements 19 and 20 and the light-sensitive elements 20 and 21 are spaced apart by the same distance matching the distance L.

As shown in FIG. 2, a cover plate 22 is rotatable about a fulcrum 23 up and down for pressing the document 13 when the latter is laid on the glass platen 2. A switch 24 is turned on when the cover plate 22 is closed.

FIG. 3 schematically shows a relation between a document setting position on the glass platen 2 and document sizes. As shown, all the documents 13 are set on the glass platen 2 with one corner thereof located at a reference position 25 which is defined at one corner of the platen 2. The size sensor 12 having the configuration shown in FIG. 1 is located at each of three positions A, B and C facing the glass platen 2. The size sensor 12 located at the position A remote from the home position HP, FIG. 4, of the scanner 3 determines whether or not the document 13 is present at sensing points (I), (II) and (III). Likewise, the size sensor 12 located at the position B is responsive to the document 13 at sensing points (IV), (V) and (VI) while the size sensor 12 located at the position C is response to the document at sensing points (VII), (VIII) and (IX). The sensing points (I), (IV) and (VII), the sensing points (II), (V), and (VIII) and the sensing points (III), (VI) and (IX) correspond respectively to the points a, b and c shown in FIG. 1. In this condition, by determining whether or not the document 13 is present at the points (I)-(IX) on the basis of data listed in Table 2 shown below, it is possible to determine the size of the document 13.

TABLE 2

| | (I) | (II) | (III) | (IV) | (V) | (VI) | (VII) | (VIII) | (IX) |
|---|---|---|---|---|---|---|---|---|---|
| A3 & ABOVE | O | O | O | O | O | O | O | O | O |
| B4 | X | O | O | O | O | O | O | O | O |
| F4 | X | X | O | O | O | O | O | O | X |
| A4R | X | X | X | O | O | O | O | O | X |
| B5R | X | X | X | O | O | O | O | X | X |
| A5R | X | X | X | O | O | O | X | X | X |
| B6R | X | X | X | X | O | O | X | X | X |
| A6R | X | X | X | X | X | O | X | X | X |
| A4 | X | X | X | O | O | O | O | O | O |
| B5 | X | X | X | X | O | O | O | O | O |
| A5 | X | X | X | X | X | O | O | O | X |
| B6 | X | X | X | X | X | X | O | X | X |

TABLE 2-continued

| | (I) | (II) | (III) | (IV) | (V) | (VI) | (VII) | (VIII) | (IX) |
|---|---|---|---|---|---|---|---|---|---|
| A6 & BELOW | X | X | X | X | X | X | X | X | X |

Note: Circle and cross in Table 2 show respectively the presence and the absence of the document 13.

Figure 5A:
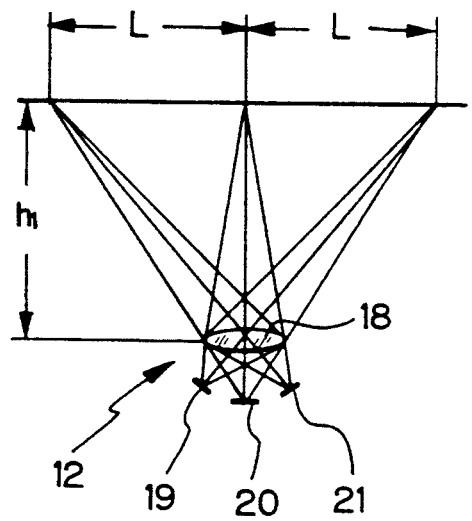
FIGS. 5A and 5B indicate a difference in position between size sensors relative to a glass platen include in the document reader.
Figure 5B:
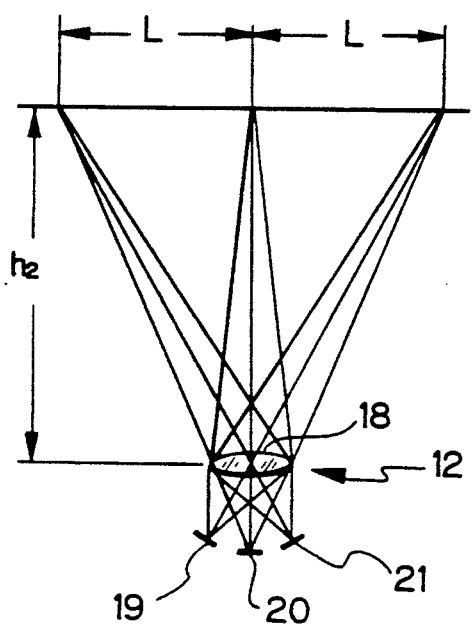

As shown in FIG. 5B, the size sensors 12 at the positions B and C are each spaced apart from the glass platen 2 by a distance $h_2$ long enough to avoid interference with the scanner 4. On the other hand, as shown in FIG. 5A, the size sensor at the position A is spaced apart from the glass platen 2 by a distance $h_1$ shorter than the distance $h_2$ since it does not interfere with the scanner 4.

Figure 6:
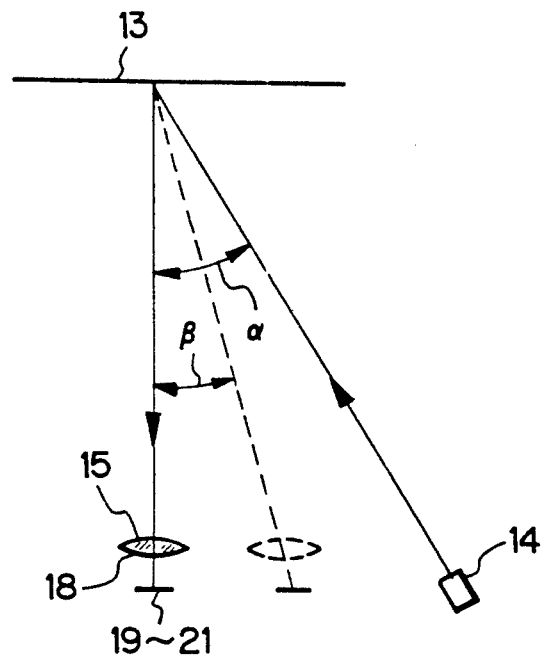
FIG. 6 shows a positional relation between an illuminating section and a light receiving section constituting the size sensor.

FIG. 6 shows a relation between the illuminating section 14 and the light receiving section 15 of each size sensor 12. As shown, the illuminating section 14 is positioned such that light emitted therefrom is incident on the document 13 at an angle $\alpha$ ranging from 5 degrees to 40 degrees. The light receiving section 15 is positioned at an angle $\beta$ ranging from 0 degree to $\alpha$ degrees as measured from the vertical to the document 13.

In the above construction, assume that the document 13 is set on the glass platen 2 with the cover plate 22 held open. Then, a pulse is applied to the light emitting element 16 of each size sensor 12. The resulting light from the light emitting element 16 is divided by the spectroscope 17 over the range of 2L in the document plane (see FIGS. 1, 5A and 5B). The resulting light from the document plane is converged by the lens 18 to be incident on the light-sensitive elements 19, 20 and 21. Assuming that the document 13 is present in the illumination range 2L shown in FIG. 1, then the light from the point a, the light from the point b and the light from the point c are incident on the light-sensitive elements 19, 20 and 21, respectively. Therefore, the ON/OFF states of the light-sensitive elements 19-21 change with the presence/absence of the document 13 at the points a, b and c. As all the size sensors 12 located at the positions A, B and C, FIG. 3, perform such an operation, the size of the document 13 on the glass platen 2 is determined.

Figure 7:
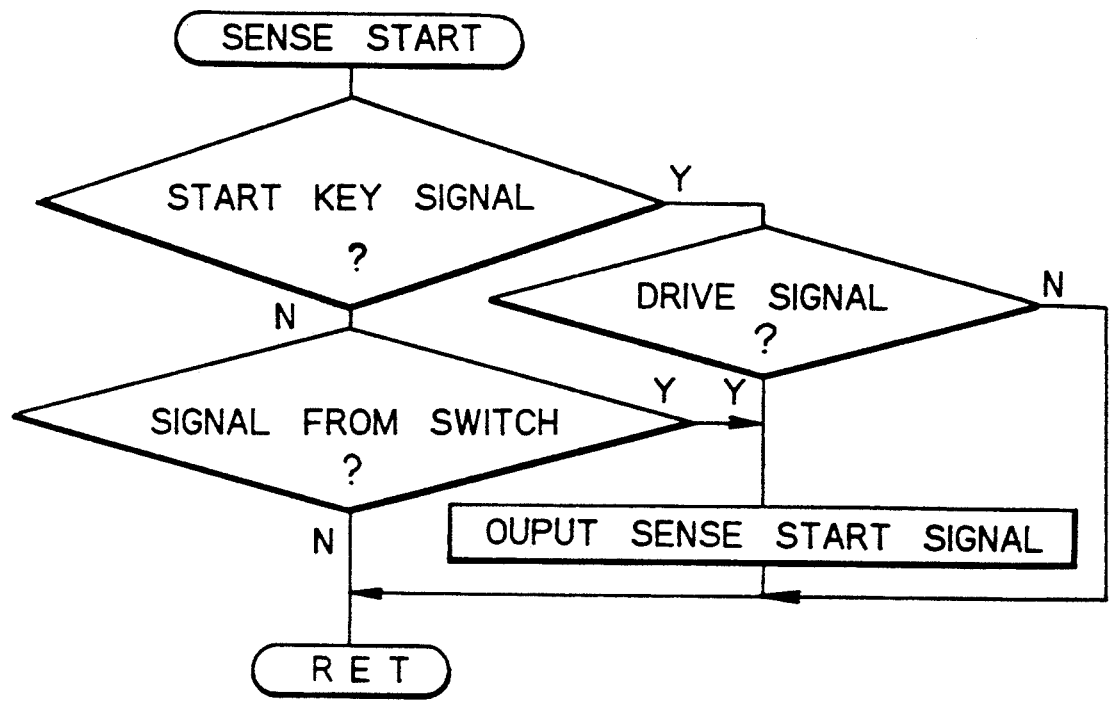
FIG. 7 is a flowchart demonstrating a sense start procedure particular to the embodiment.

A reference will be made to FIG. 7 for describing how to start sensing the size of the document 13 specifically. First, as the document 13 is set on the glass platen 2, and then the cover plate 22 is closed, the switch 24, FIG. 2, is turned on. The resulting output of the switch 24 is fed to a controller, not shown. When a start key is operated only by the signal from the switch 24, the controller outputs a sense start signal on the basis of the signal from the switch 24. On the other hand, when the start key is operated without the signal from the switch 24, the controller outputs a sense start signal on the basis of a drive signal meant for the scanners 3 and 4.

Figure 8:
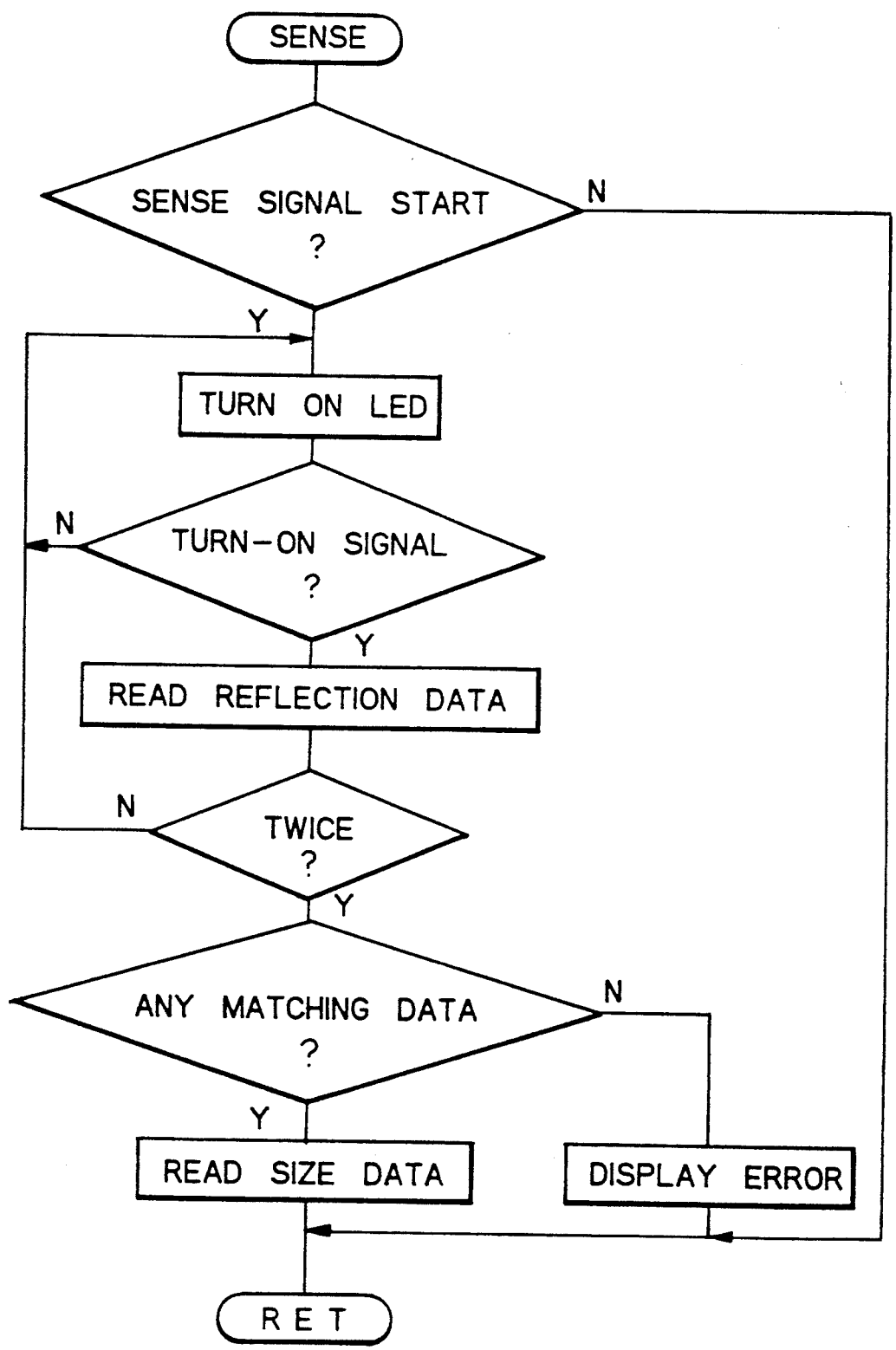
FIG. 8 is a flowchart indicative of a size sensing operation associated with the procedure of FIG. 7.

As shown in FIG. 8, on the appearance of the sense start signal, a pulse is applied to an LED (Light Emitting Diode; light emitting element 16) to read reflection data. Specifically, as the light-emitting element 16 illuminates the document plane, light from the document plane is incident to the light-sensitive elements 19-21. The resulting outputs of the light-sensitive elements 19-21 are compared with the data listed in Table 2, and then matching data are read out of Table 2. If the former does not match any of the data of Table 2, an error is indicated by display means, not shown.

Figure 9:
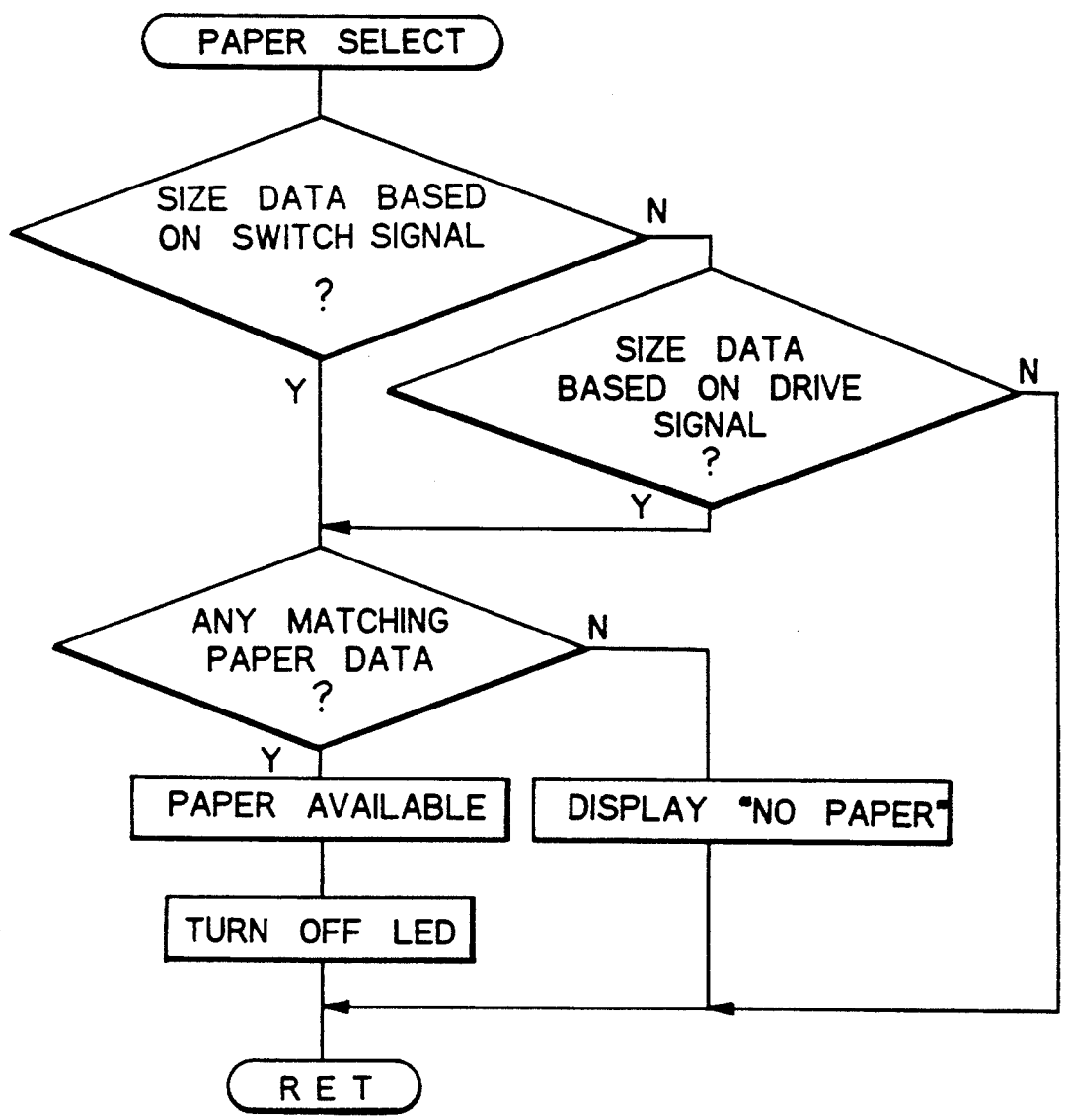
FIG. 9 is a flowchart showing a paper selecting operation also associated with the procedure of FIG. 7.

Further, as shown in FIG. 9, the size data of the document 13 based on the output of the switch 24 or based on the drive signal is compared with paper data. If the former is coincident with the latter, it is determined that papers matching the document are available, and the LED (light-emitting element 16) is turned off. If otherwise, an error is indicated by the display means.

As stated above, while the embodiment has the size sensor 12 made up of a plurality of light-sensitive elements 19-21, it is practicable with a single light-sensitive element, a single spectroscope 17, and a single lens 18. This, coupled with the fact that a single size sensor 12 is capable of sensing a plurality of document sizes, noticeably reduces the number of necessary optical elements and, therefore, the cost of the sensing device.

In the illustrative embodiment, the light emitting element 16 and spectroscope 17 constitute the illuminating section 14 having a predetermined illumination range 2L. The lens 18 and light-sensitive elements 19-21 constitute the light receiving section 15. A plurality of size sensors 12 each comprising the combination of such two sections 14 and 15 are located to face the glass platen 2 at the positions A, B and C and at the previously stated distances $h_1$ and $h_2$. The elements 19-21 of each size sensor 12 face the lens 18, as shown in FIGS. 5A and 5B. Despite such a configuration, since the elements 19-21 are spaced apart by a predetermined distance on an arc, the lenses 18 and elements 19-21 of the respective size sensors 12 can be commonly used to cut down the cost.

In addition, as shown in FIG. 6, while the light from the illuminating section 14 is incident on the document plane at an angle of 5 degrees to 40 degrees, the reflection from the document plane toward the illuminating section 14 side is incident on the light receiving section 15. This is successful in reducing the influence of undesired reflections from the glass platen 2 and cover plate 22 and in minimizing the error ascribable to the dislocation of the document 13.

Figure 10:
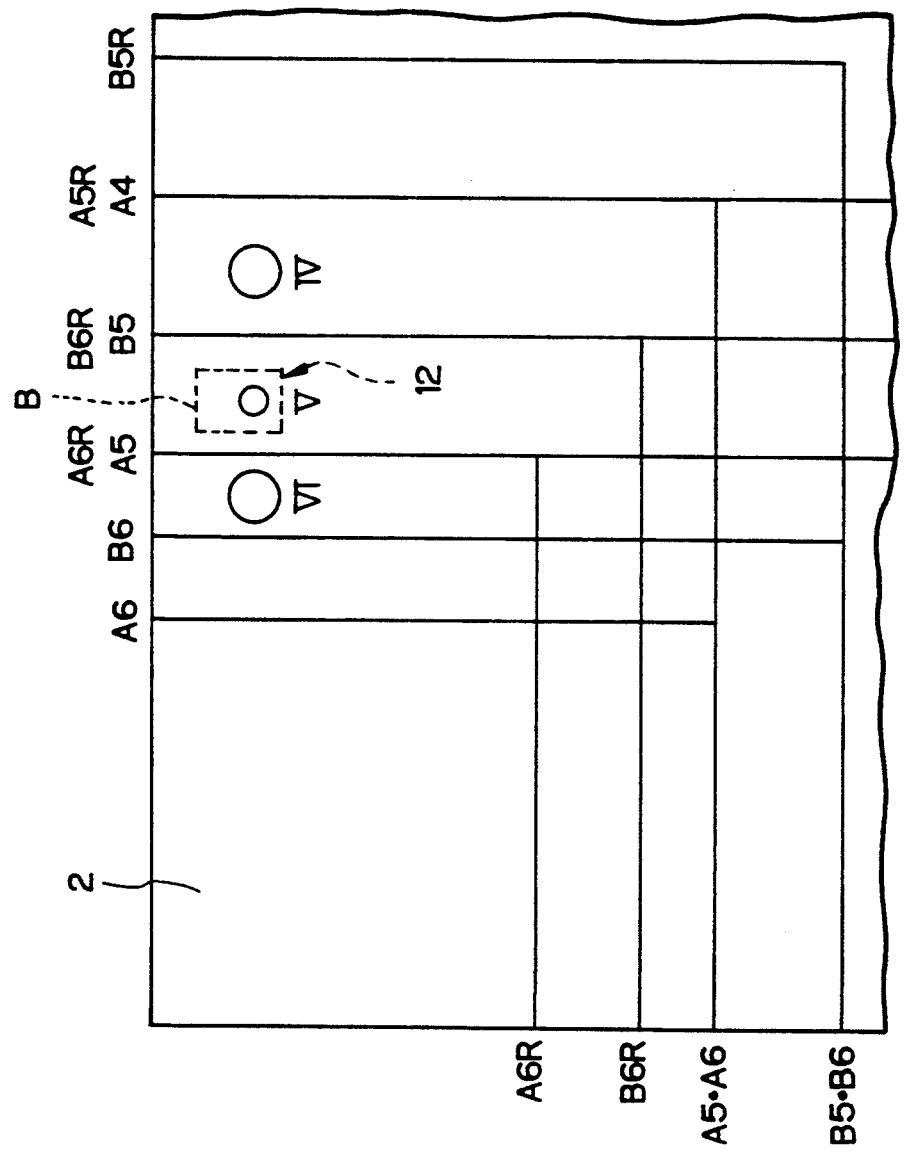
FIG. 10 is a plan view showing a relation between the glass platen and a size sensor and representative of an alternative embodiment of the present invention.

An alternative embodiment of the present invention will be described with reference to FIG. 10. In the figure, the same or similar constituents to those of the previous embodiment are designated by like reference numerals, and redundant description will be avoided for simplicity. This is also true with other embodiments which will follow. While the following description will concentrate on the size sensor 12 located at the position B, it also applies to the other size sensors 12 located at the positions A and C. In the illustrative embodiment, the diameters of the points (IV), (V) and (VI) on the document plane sensed by the lens 18 are so selected as to sequentially increase with their distance from the optical axis of the lens 18. It follows that light is evenly incident on the light-sensitive elements 19-21 despite that the intensity of the reflection from the document plane 13 and propagating through the lens 18 sequentially decreases toward the outside of the lens 18 according to the $\cos^4$ rule. In addition, the sensing error is reduced even when the document 13 is slightly dislocated on the glass platen 2.

Figure 11A:
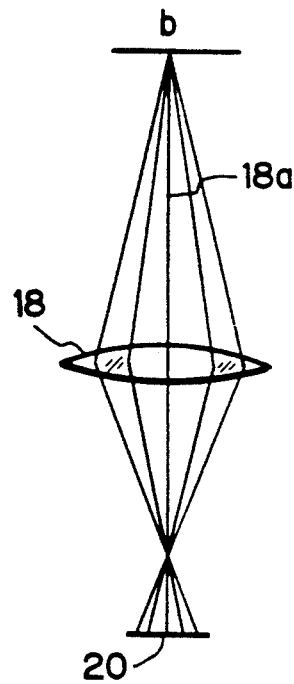
FIGS. 11A and 11B show a light receiving section representative of another alternative embodiment of the present invention.
Figure 11B:
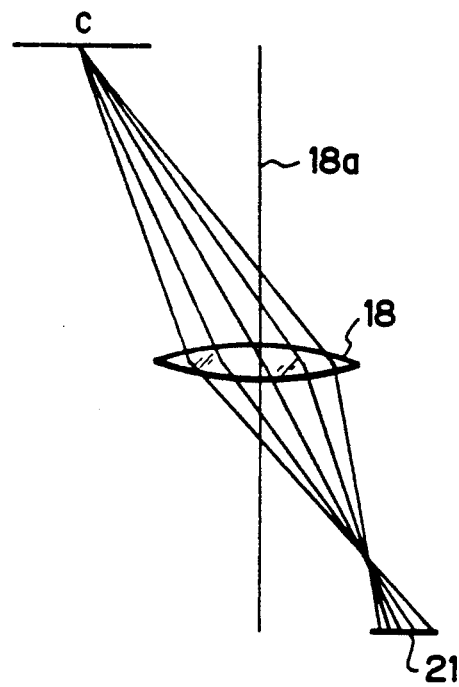

FIGS. 11A and 11B show another alternative embodiment of the present invention. Specifically, FIG. 11A indicates a condition wherein the reflection from the sensing point b, FIG. 1, is incident on the light-sensitive element 20 which is located on the optical axis 18a of the lens 18. FIG. 11B indicates another condition wherein the reflection from the sensing point c, FIG. 1, is incident on the light-sensitive element 21 remote from the optical axis 18a. The condition wherein the reflection from the sensing point a, FIG. 1, is incident on the light-sensitive element 19 is simply symmetrical to the condition shown in FIG. 11B and will not be described specifically. When the lens 18 is implemented as a single lens, the light will be more diffused as it becomes remoter from the optical axis 18a. In the illustrative embodiment, since the light-sensitive elements 19 and 21 remoter from the optical axis 18a are provided with a greater light receiving area, the sensing error is reduced even when the document 13 is dislocated.

Figure 12:
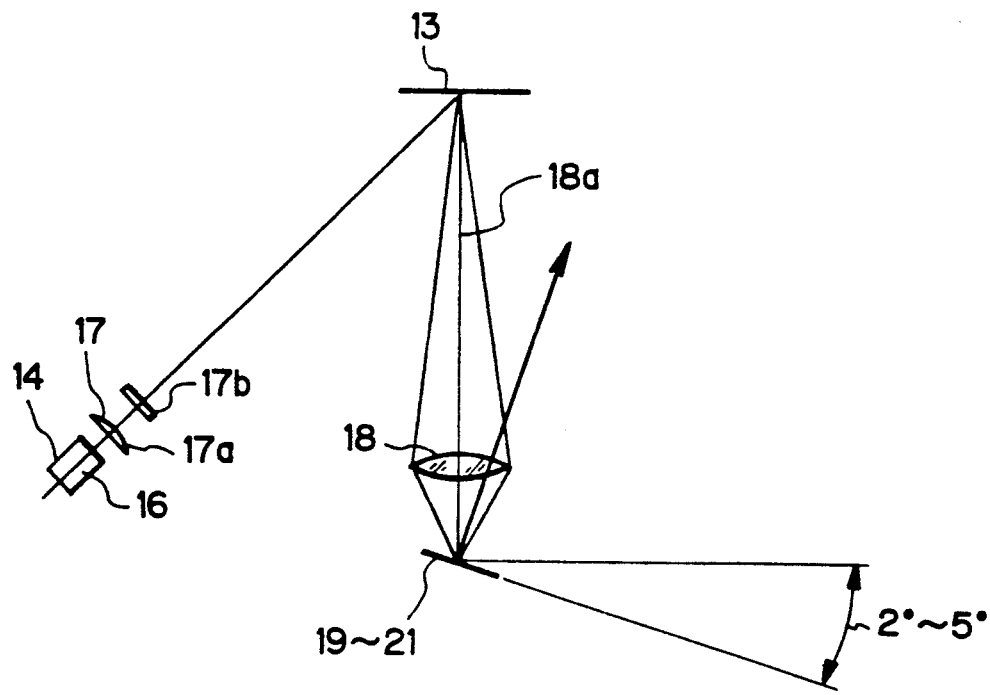
FIG. 12 shows a size sensor representative of another alternative embodiment of the present invention.
Figure 13:
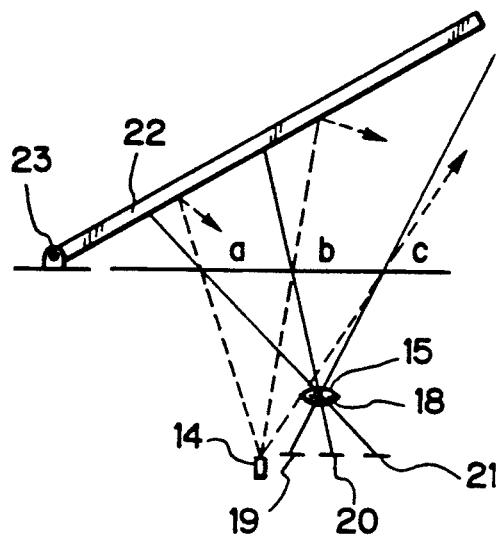
FIG. 13 indicates a positional relation between a phase sensor and a cover plate and representative of another alternative embodiment of the present invention.
Figure 14:
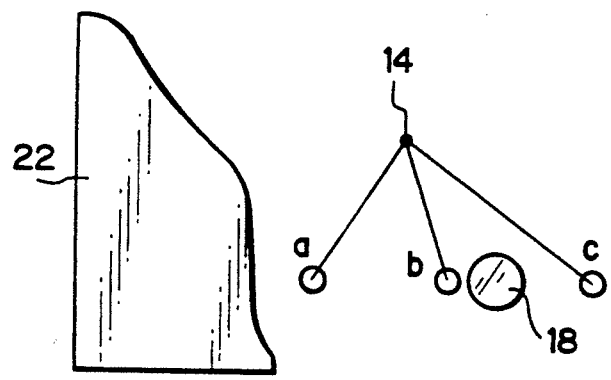
FIG. 14 is a plan view associated with FIG. 13.
Figure 15:
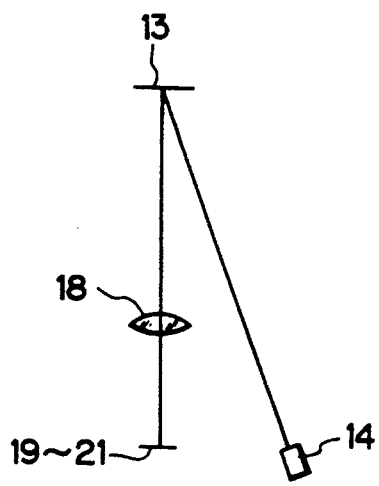
FIG. 15 is a side elevation also associated with FIG. 13.

Another alternative embodiment of the present invention will be described with reference to FIG. 12. Usually, the light emitting element 16 is implemented as one which emits infrared rays which are not noticeable. However, the attenuation rate of infrared rays is low. Hence, although the light from the document plane is incident on the light-sensitive elements 19-21, it is likely that part of the light is again reflected by the surfaces of the elements 19-21 and then reflected toward the lens 18 to reach the elements 19-21 again. In the light of this, this embodiment inclines the light receiving surfaces of the elements 19-21 2 degrees to 5 degrees relative to the vertical plane which is perpendicular to the optical axis 18a of the lens 18. In this configuration, even when the light propagating through the lens 18 is partly reflected by the light-receiving surfaces of the elements 19-21, the reflections are reflected outward by the inclines surfaces. This eliminates errors ascribable to the undesirable light otherwise incident to the elements 19-21.

A reference will be made to FIGS. 13-16 for describing another alternative embodiment of the present invention. In the figures, labeled a, b and c are the sensing points in the document plane. In this embodiment, the illuminating section 14 constituted by the light emitting element 16 and spectroscope 17 is located closer to the fulcrum 23 of the cover plate 22 than the light receiving section 15 constituted by the lens 18 and light-sensitive elements 19-21. In this configuration, even when the cover plate 22 is open before the document 13 is laid on the glass platen 2, although the light from the illuminating section 14 is reflected by the cover plate 22, the light from the cover plate 22 is directed upward missing the light-receiving section 15. Should the light from the cover plate 22 be incident on the light receiving section 15, it would be determined that the document 13 is present.

Figure 16:
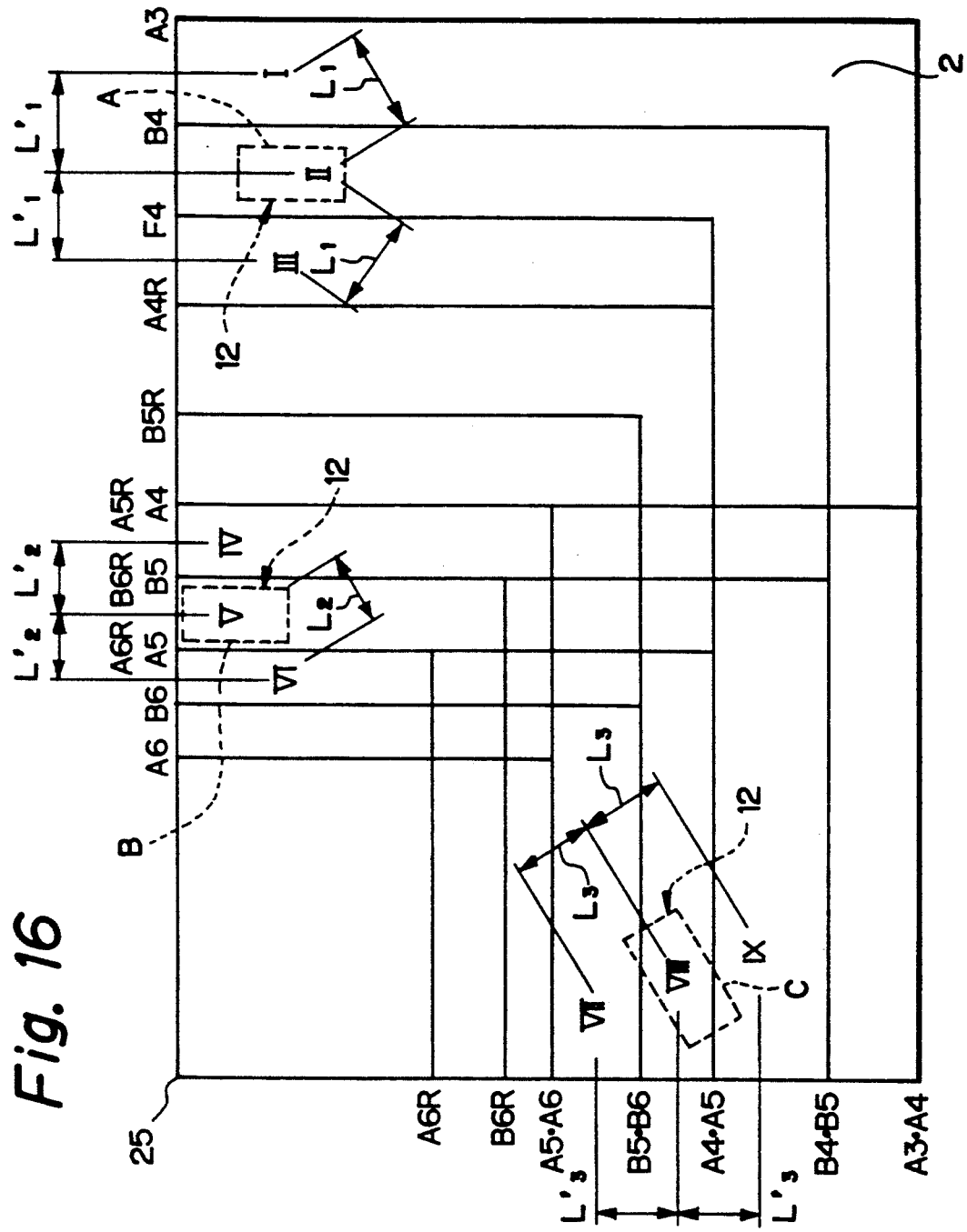
FIG. 16 is a plan view showing another specific arrangement of size sensors relative to the glass platen.

The positional relation between the document 13 and the sensing points of the optics may be modified as shown in FIG. 16. As shown, regarding the size sensor 12 located at the position A, the distance between the sensing points (I) and (II) and the distance between the sensing points (II) and (III) both are $L_1$, but they are $L'_1$ smaller than $L_1$ when the sensing points are projected in the subscanning direction. As for the size sensor 12 at the point B, the distance between the sensing points (IV) and (V) and the distance between the sensing points (V) and (VI) are respectively $L'_2$ and $L_2$, but they are $L'_2$ smaller than $L_2$ when the sensing points are projected in the subscanning direction. Further, as for the size sensor 12 at the position C, the distance between the sensing points (VII) and (VIII) and the distance between the sensing points (VIII) and (IX) both are $L_3$, but they are $L'_3$ smaller than $L_3$ when the sensing points are projected in the subscanning direction. Hence, the substantial distance between associated sensing points is greater that the distance shown in FIG. 3, allowing the distance between nearby ones of the light-sensitive elements 19-21 to be increased.

Figure 17:
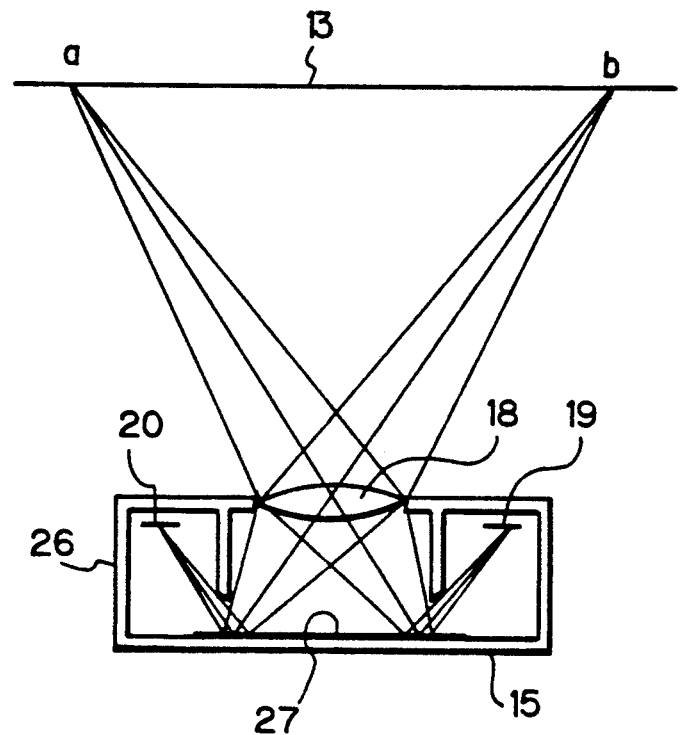
FIG. 17 is a section showing another specific configuration of the light receiving section.
Figure 18:
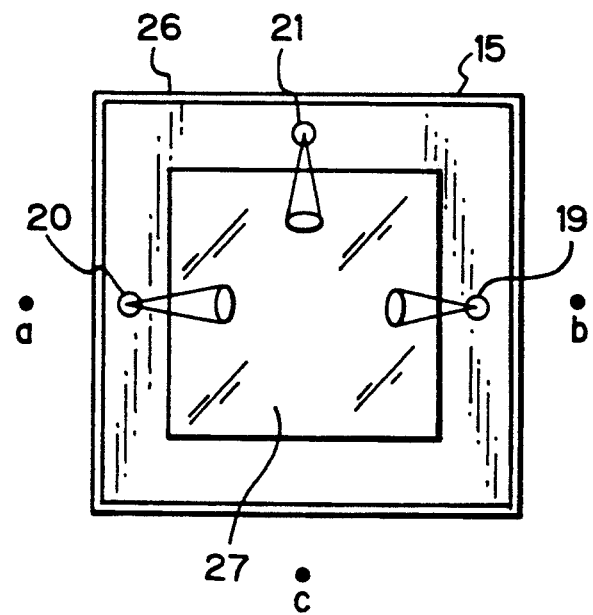
FIG. 18 is a plan view associated with FIG. 17.

Another specific configuration of the light receiving section 15 is shown in FIGS. 17 and 18. As shown, the light receiving section 15 has a rectangular casing 26 supporting the lens 18 at the top opening thereof. A mirror 27 is located on the bottom of the casing 26. The light-sensitive elements 19-21 are disposed in the casing 26, and each is located at the center of one of three sides. In FIG. 17, a and b indicate the sensing points in the document plane while, in FIG. 18, a, b and c indicate the sensing points in the document plane. In this construction, the light from the point a, the light from the point b and the light from the point c are respectively incident on the light-sensitive elements 19, 20 and 21 via the lens 18 and mirror 27. This allows the casing 26 to have a thin configuration while insuring the optical lengths from the lens 18 to the elements 19-21.

Figure 19:
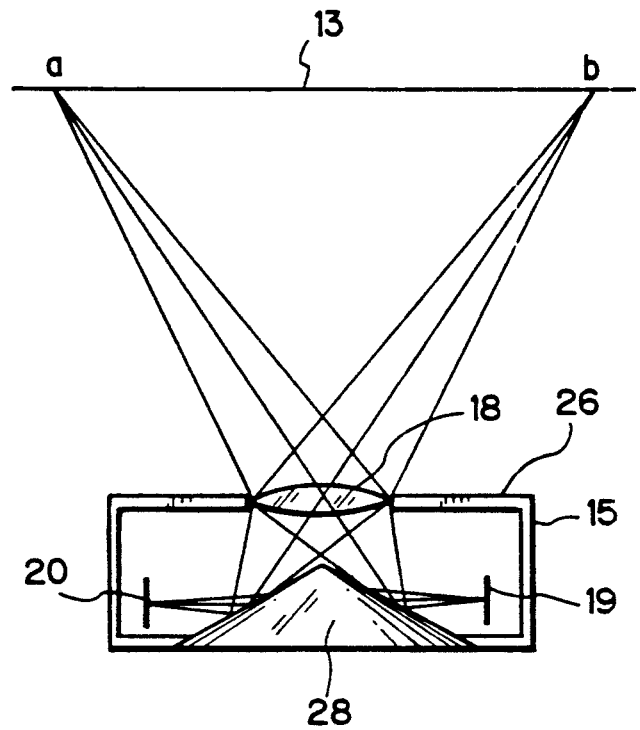
FIG. 19 is a section showing still another specific configuration of the light receiving section.
Figure 20:
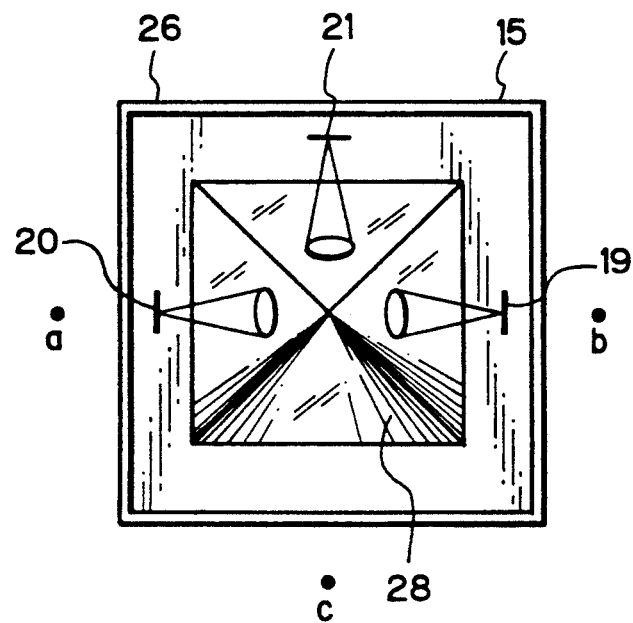
FIG. 20 is a plan view associated with FIG. 19.

If desired, as shown in FIGS. 19 and 20, the mirror 27 may be replaced with a pyramidal mirror 28. This is also successful in reflecting the light transmitted through the lens 18 toward the light-sensitive elements 19-21.

In summary, in accordance with the present invention, light issuing from a light emitting element is divided into predetermined ranges by a spectroscope to illuminate a document while the resulting reflections are incident on respective light-sensitive elements via a lens. Hence, the flux of light from the document toward the lens changes with the document size. In response to such a change, all the light-sensitive elements or only part thereof located at particular positions receive the light from the lens. This allows a document size to be determined on the basis of the outputs of the light-sensitive elements. Despite that each size sensor has a plurality of light-sensitive elements, a single light emitting element, a single spectroscope and a single lens suffice. Moreover, each size sensor can determine a plurality of document sizes. As a result, the number of required optical elements and, therefore, the cost is reduced.

When a plurality of size sensors are arranged in optics adapted to read an image, it is sometimes necessary that each sensor be located at a different distance from the document surface in order to avoid interference with a scanner. In such a case, despite that the optical length from the document to the light receiving section differs from one sensor to another, the lenses and light-sensitive elements of the sensors can be commonly used to cut down the cost only if a plurality of light-sensitive elements are arranged at a predetermined distance on an arc.

Further, in accordance with the present invention, while the light from the illuminating section is incident on the document plane at an angle of 5 degrees to 40 degrees, the reflection from the document plane toward the illuminating section side is incident on the light receiving section. This is successful in reducing the influence of undesired reflections from the glass platen 2 and cover plate and in minimizing the error ascribable to the dislocation of the document.

Light is evenly incident on the light-sensitive elements despite that the intensity of light from the document plane and propagating through the lens sequentially decreases toward the outside of the lens according to the $\cos^4$ rule. In addition, the sensing error is reduced even when the document is slightly dislocated on the glass platen.

When the lens is implemented as a single lens, the light will be more diffused as it becomes remoter from the optical axis. In the illustrative embodiment, since the light-sensitive elements remoter from the optical axis are provided with a greater light receiving area, the sensing error is reduced despite the dislocation of the document.

Even when the light propagating through the lens is partly reflected by the light-receiving surfaces of the elements, the reflections are reflected outward by inclines surfaces. This eliminates errors ascribable to the undesirable light otherwise incident to the elements.

Even when the cover plate is open before the document is laid on the glass platen, although the light from the illuminating section is reflected by the cover plate, the light from the cover plate is directed upward missing the light receiving section. Should the light from the cover plate be incident on the light-receiving section, it would be determined that the document is present.

Various modifications will become possible for those skilled in the art after receiving the teachings of the present disclosure without departing from the scope thereof.

What is claimed is:

1. A document size sensing device having at least one sensing means, comprising:
    a light emitting element facing a transparent glass platen to be loaded with a document;
    a spectroscope for dividing light issuing from said light emitting element into a plurality of beams, said spectroscope mounted with respect to said light emitting element such that said spectroscope is between said light emitting element and a plane where the document is present such that light issuing from said light emitting element is first directed to said spectroscope and the plurality of beams are then directed toward said plane where the document is present;
    a lens for receiving light reflected from said plane; and
    a plurality of light-sensitive elements facing a light output side of said lens for receiving the light transmitted through said lens.

2. A device as claimed in claim 1, wherein said light emitting element and said spectroscope constitute an illuminating section for illuminating the document over a predetermined range, said lens and said plurality of light-sensitive elements constituting a light receiving section, said illuminating section and said light receiving section constituting a pair and a plurality of said pairs are provided at a respective plurality of positions of the glass platen at various locations relative to said document, the plurality of light-sensitive elements of each pair being located at a predetermined distance on an arc while facing said lens.

3. A device as claimed in claim 1, wherein said spectroscope and said light emitting element constitute an illuminating section which emits light to the document at an incident angle of 5 degrees to 40 degrees, said lens and said plurality of light-sensitive elements constituting a light receiving section which is interposed between a vertical line extending to a location at which said light is incident on said document and said illuminating section.

4. A device as claimed in claim 1, wherein a sensing point of the document has a diameter as measured on said lens which sequentially increases radially outward from an optical axis of said lens.

5. A device as claimed in claim 1, wherein at least some of said plurality of light sensitive elements are located radially outward of said lens and have a greater light-sensitive area than a light-sensitive element adjoining an optical axis of said lens.

6. A device as claimed in claim 1, wherein each of said light-sensitive; elements has a light-sensitive surface thereof inclined relative to a vertical plane perpendicular to an optical axis of said lens.

7. A device as claimed in claim 1, further comprising a cover plate rotatable about a fulcrum for covering the document laid on the glass platen, said light emitting element and said spectroscope constituting an illuminating section which is located closer to said fulcrum than a light receiving section constituted by said lens and said light-sensitive elements.

8. The document size sensing device of claim 1, wherein said lens receives said plurality of beams after being reflected from said plane.

9. The document size sensing device of claim 1, wherein said plurality of light-sensitive elements includes three light sensitive elements which are arranged such that the three light sensitive elements are not collinear.

10. The document size sensing device of claim 1, wherein said plurality of light-sensitive elements respectively sense a plurality of sensing points on said plane, and wherein said plurality of sensing points are not collinear.

11. The document size sensing device of claim 1, wherein said spectroscope includes a diffraction grating.

12. The document size sensing device of claim 1, wherein at least some of said plurality of light-sensitive elements have different light-sensitive area sizes.

13. The document size sensing device of claim 2, wherein each of said plurality of light-sensitive elements face a same side of said lens.

* * * * *

UNITED STATES PATENT AND TRADEMARK OFFICE
CERTIFICATE OF CORRECTION

PATENT NO. : 5,321,273
DATED : June 14, 1994
INVENTOR(S) : Toru KAMIYAMA, et al.

It is certified that error appears in the above-indentified patent and that said Letters Patent is hereby corrected as shown below:

On the title page, Item [54] and Column 1, Lines 2&3, the title should read as follows:

--DOCUMENT SIZE SENSING DEVICE HAVING A SPECTROSCOPE--

Signed and Sealed this

Twentieth Day of September, 1994

Attest:

BRUCE LEHMAN

Attesting Officer

Commissioner of Patents and Trademarks